May 17, 1960  E. BOUCHEROT  2,937,333
BORE HOLE TELEMETERING APPARATUS
Filed Dec. 23, 1957  2 Sheets-Sheet 1
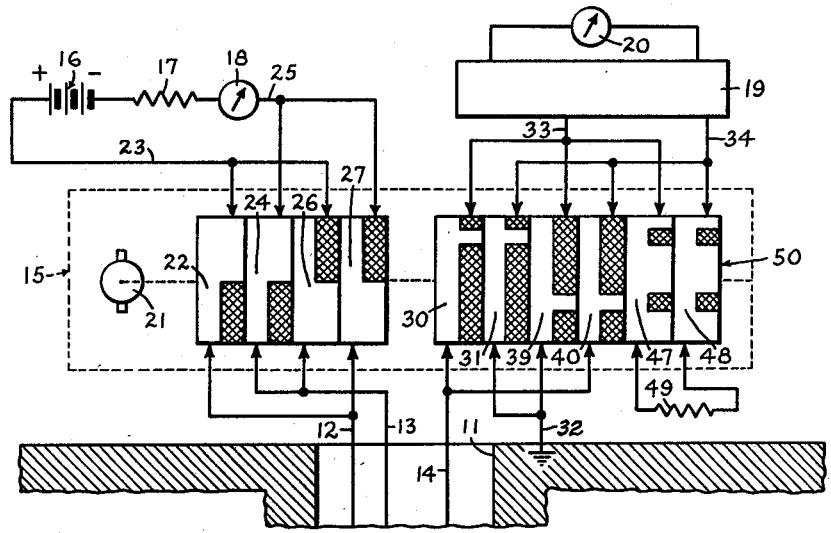
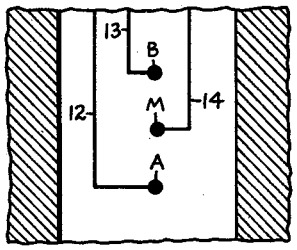
FIG.I.
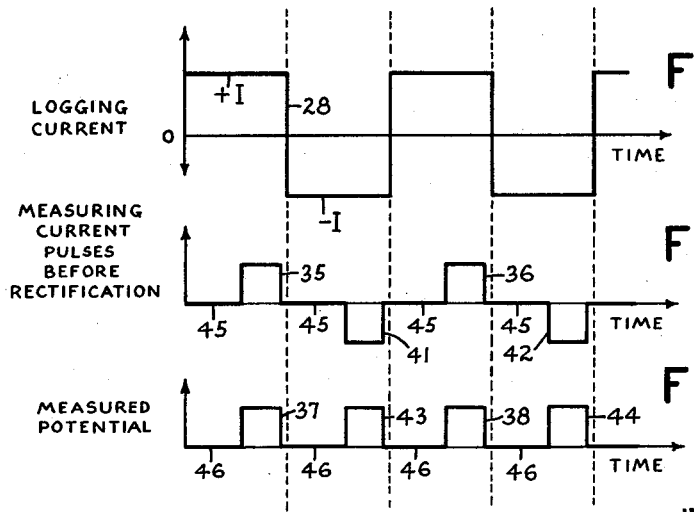
INVENTOR
EDMOND BOUCHEROT
BY
HIS ATTORNEYS May 17, 1960
E. BOUCHEROT
2,937,333
BORE HOLE TELEMETERING APPARATUS
Filed Dec. 23, 1957
2 Sheets-Sheet 2
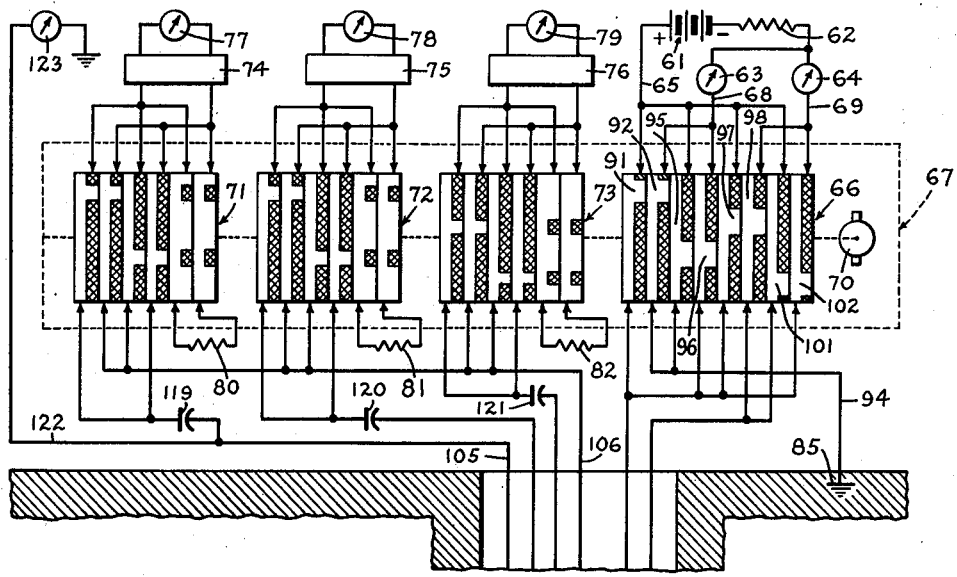
FIG.3.
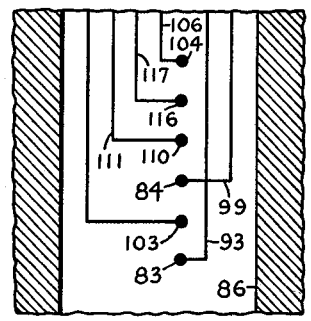
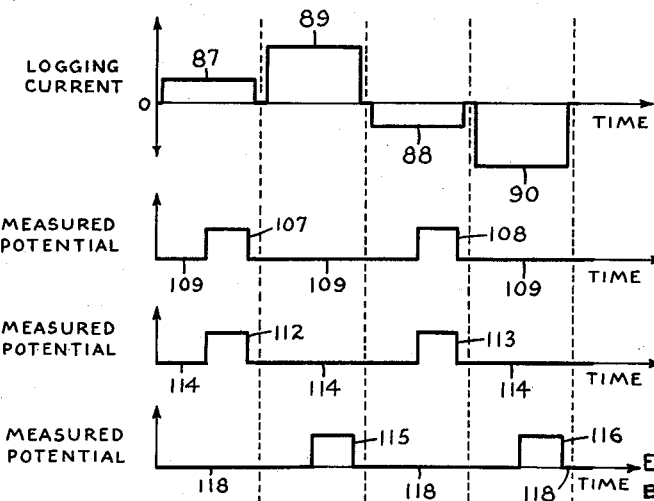
FIG.4A.
FIG.4B.
FIG.4C.
FIG.4D.
INVENTOR
EDMOND BOUCHEROT
BY Brumbaugh, Free,
Graves & Donohue
HIS ATTORNEYS United States Patent Office 2,937,333
Patented May 17, 1960

2,937,333

BORE HOLE TELEMETERING APPARATUS

Edmond Boucherot, Paris, France, assignor to Societe de Prospection Electrique Procedes Schlumberger, Paris, France, a corporation of France Application December 23, 1957, Serial No. 704,426

Claims priority, application France December 26, 1956

6 Claims. (Cl. 324—1)

The present invention relates to electrical logging apparatus, and, more particularly, to novel and improved systems and apparatus for use in the electrical logging of bore holes and other similar remote locations.

One of the methods, currently used for the electrical logging of bore hole and similar remote locations by remote measurements using apparatus having a minimum number of electrical conductors leading from the remote location to the location where the measurements are either indicated or otherwise utilized, uses apparatus including periodically operating switching mechanisms or pulse generating devices which provide for the successive and periodical energization of a variety of measuring instruments having leads extending from inside the bore hole usually up to the ground level.

For example, a series of electrical pulses during operative periods of a time cycle separated by inoperative periods may be fed through the periodically operating switching mechanisms into respective measuring circuits adapted to measure or otherwise provide indications of each sequence of operation, the pulses in the series being distinguished by different polarities or other characteristics. Such a method is utilized, for example, when it is desired to measure through the same circuit several values of the apparent electrical resistivity of a plurality of layers of earth formations through which the logging operation is being performed together with other signals representative of differences in potential which may appear at the level of the different layers, either as a result of currents artificially produced with a view to measuring the resistivities of the formations or through naturally occurring currents. These differences in voltage may then be measured above ground level by means of suitable conventional measuring instruments such as galvanometers.

It has been found that when periodically operating switching mechanisms, are used in the above manner, it is necessary to provide in the output circuits fed by the switching mechanisms, filters adapted to filter out the A.C. components of the measuring currents, so as to eliminate undue vibrations, for example, of the galvanometer needles.

Heretofore, it has been customary to resort to the use of special filters of a type having a constant input resistance, as the use of conventional simple filters is susceptible of unsatisfactory results in the measurements to be read on the galvanometers or other indicating instruments, since the indications given by the galvanometer are subject to variations dependent on characteristics of the pulses fed to them. This variation is due to the fact that, during each time cycle of the switching mechanism or pulse generating device, the measuring instrument is intermittently connected during predetermined operative periods with the detecting apparatus positioned in the bore hole through the agency of an electrical cable, the resistance of which has a predetermined value, the respective conductors of the cable being disconnected or short circuited during the idle period or periods between the operative periods of the time cycle.

Filters having a constant input resistance are normally very intricate and bulky, and their use under field conditions is obviously disadvantageous. This is especially so when the number of measurements to be made by the electrical logging apparatus is fairly large.

In accordance with the invention, the above disadvantages are overcome by apparatus which is provided to eliminate the influence of the aforementioned discontinuities during the idle periods of the time cycle in the input to the filters so that the use of simple small-sized filters of conventional type may be utilized. More particularly, means are provided for introducing in the input circuit to the filter a resistance which is substantially equivalent to the resistance of the measuring instrument in the remote location in the bore hole including the resistance of the electrical leads or conductors leading therefrom during the idle periods of the time cycle of the switching mechanism. Under these conditions, it has been found that the indications provided by the galvanometer become very steady and are independent of the switching frequency of the switching mechanism.

For a more definite understanding of the invention including the various features and advantages thereof, reference may be had to the following detailed description taken in conjunction with the accompanying figures of the drawing, in which:

Figure 1 is an electrical schematic diagram of an exemplary embodiment of an electrical well logging apparatus, in accordance with the invention;

Figs. 2A, 2B and 2C are graphical representations of the time cycle of the logging current, measuring current pulses, and measured potential in the embodiment of Fig. 1;

Fig. 3 is an electrical schematic diagram of an additional embodiment of an electrical well logging apparatus, in accordance with the invention; and Figs. 4A, 4B, 4C and 4D are graphical representations of the time cycle of the logging current, and measured potentials in the exemplary embodiment of Fig. 3.

In Fig. 1, a plurality of spaced-apart electrodes A, B and M are suspended in a bore hole 11, in any suitable conventional manner (not shown) and are connected to measuring and indicating equipment at the surface of the earth through electrical conductors 12, 13 and 14, respectively, which may be carried by a conventional electrical cable (not shown).

At the surface of the earth, the electrical conductors 12 and 13 are connected through respective commutating sections of a periodically operating switching mechanism 15 to a source of unidirectional current of constant magnitude including, for example, a battery 16 and a current limiting resistance 17, and an electrical measuring instrument 18, such as a galvanometer. Similarly the electrical conductor 14 is connected at least intermittently by means of the periodically operating switching mechanism 15 through a low pass filter means 19, which may take any suitable conventional form to a measuring instrument 20.

The periodically operating switching mechanism 15, in this exemplary embodiment, comprises a commutating device having a plurality of sections driven in synchronism by a suitable electrical motor 21 of conventional form, and is intended to operate in a suitable well known manner. Each of the respective commutating sections includes on its surface electrically conductive portions represented by the plain areas on the drawing and electrically nonconductive portions represented by the hatched areas. The surfaces of the respective commutating sections are adapted to be rotatably engaged by suitable electrical brushes connected respectively to the various electrical conductors leading to the electrodes in the bore hole 11 and to the electrical conductors connected to the source of electrical energy and the measuring instruments.

More particularly, the first commutating section, 22, has a brush connected to the electrical conductor 12 leading to the electrode A in the bore hole 11, and a brush connected to a conductor 23 leading to the battery 16, and the conductive portions of the surface of the commutating section 22 are arranged in a conventional manner to electrically connect the conductor 12 and the conductor 23 during predetermined time periods of the time cycle of the switching mechanism 15. The second electrical commutating section, 24, is substantially identical to the commutating section 22 and includes a brush connected to the conductor 13 leading to the electrode B in the bore hole 11 and a brush connected to a conductor 25 leading through the instrument 18 and the current limiting resistance 17 to the terminal of the battery 16 opposite to that which is connected to the conductor 23. The configuration of the commutating section 24 is such as to cause the conductor 13 to be electrically connected to the conductor 25 during the same periods of the time cycle as the conductor 12 is connected to the conductor 23, thereby connecting the source of electrical energy including the battery 16 across the electrodes A and B.

Commutating sections 26 and 27 include brushes connected respectively to the conductors 13 and 12, and also brushes respectively connected to the conductors 23 and 25, so as to connect the conductor 13 leading to the electrode B to the conductor 23, and the conductor 12 leading to the electrode A to the conductor 25 during periods of the time cycle of the switching mechanism 15 other than those periods in which connections are made by the commutating sections 22 and 24. During the time periods that the commutating sections 26 and 27 connect the conductors 12 and 13 to the conductors 25 and 23, respectively, the source of electrical energy including the battery 16 is connected across the electrodes A and B, but in an opposite polarity sense to the connections made through the commutating sections 22 and 24. As a result of the connections made by the commutating sections 22 and 24, and 26 and 27 of the switching mechanism 15, an alternating logging current having a maximum intensity, alternately +I and —I during alternate portions of the time cycle as indicated by the curve 28 in Fig. 2A, is supplied to the electrodes A and B, the frequency of the logging current being determined by the speed of operation of the switching mechanism 15.

Commutating sections 30 and 31 include brushes respectively connected to a conductor 14 leading to the electrode M in the bore hole and to a conductor 32 leading to a suitable electric ground, and brushes respectively connected to a conductor 33 and a conductor 34 leading to the input to the low pass filter means 19. The commutating sections 30 and 31 are adapted to connect the conductor 14 to the conductor 33 and the conductor 32 to the conductor 34 during predetermined time periods of the time cycle, preferably during the time periods when the logging current supplied to the electrodes A and B has a magnitude +I so that measuring current pulses 35 and 36 (Fig. 2B) are fed through the switching mechanism 15 and the low pass filter means 19 to the measuring instrument 20 in the form of measured potential pulses 37 and 38 (Fig. 2C).

Commutating sections 39 and 40 include brushes respectively connected to conductor 32 leading to the ground and conductor 14 leading to the electrode M, and brushes leading to conductors 33 and 34, so as to connect the electrode M and the ground to the input to the low pass filter means 19 and the measuring instrument 20 during predetermined periods of time other than the periods of time when the connections are made by means of the commutating sections 30 and 31, but in a reversed polarity sense. The commutating sections 39 and 40 act to receive the measuring current pulses 41 and 42 (Fig. 2B), and to rectify or reverse the polarity of these pulses so as to provide measured potential pulses 43 and 44 (Fig. 2C) to the measuring instrument 20.

As is seen in Figs. 2B and 2C, time periods 45 and 46, respectively, during which the remote measuring devices are not connected to the input of the low pass filter means 19 and the measuring instrument 20 are interposed between the periods when signals are being received. Commutating sections 47 and 48 including brushes respectively connected to opposite ends of an electrical resistance element 49, and brushes connected to conductors 33 and 34 leading to the low pass filter means 19, serve to connect the electrical resistance element 49 across the input to the low pass filter means 19 during at least a portion of the time periods 45 and 46, as indicated by the relationship of the plain and hatched areas of the commutating sections 47 and 48 with the plain and hatched areas of the commutating sections 30, 31, 39 and 40.

The resistance value of the electrical resistance element 49 is equivalent to the resistance of the conductor 40 and other down-hole equipment associated therewith.

The potential at the electrode M depends, as is well known in the art of electrical well logging, on the resistivity of the geological layers of the earth formation through which the bore hole passes, and its measurement provides a representation of the value of the apparent resistivity of the respective earth formations. This potential assumes alternate positive and negative values, as a consequence of the reversal of the logging current 28 fed through the switching mechanism 15. However, the negative alternations are rectified before they reach the measuring instrument 20 by means of the measuring portion 50 of the commutating switch 15, which includes the commutating sections 30, 31, 39, 40, 47 and 48. It is well known in the electrical well logging art that this alternation of positive and negative pulses of the logging current is intended to eliminate variations in the voltage to be measured due to spontaneous potentials resulting from naturally occurring currents in the bore hole. Furthermore, in accordance with conventional practice, the measuring current is transmitted to the measuring means 20 during each alternation of the current only after a short delay following the beginning of the logging current interval, so that measurements are made only when the current has been actually established. Because of this practice, there is interposed between successive operative positions of the switching mechanism 15, during which the switching mechanism 15 permits current to pass alternately in opposite directions toward the measuring instrument 20, the idle periods 45 and 46.

Thus there is provided, in accordance with the present invention, a system which can utilize conventional filters (in this case a low pass filter, although band pass filters may be used in some circumstances) without having to resort to special purpose filters having a constant input resistance to prevent the characteristics of the particular type of switching mechanism affecting the measurements being made.

In contrast to the relatively simplified embodiment of Fig. 1, the logging apparatus of Fig. 3 provides for the simultaneous measurement of three apparent resistivities and of spontaneous potentials appearing inside the bore hole and adjacent earth formations. As in Fig. 1, the source of electrical energy for the electrical logging operations is provided by a battery 61 adapted to pass current through a conventional current limiting resistance 62 and selectively through one of the measuring instruments 63 and 64. One side of the source of electrical energy is connected through a conductor 65 to a plurality of different sections of a current feeding commutating unit 66 of a periodically operated switching mechanism 67 similar to the switching mechanism 15 of Fig. 1. Similarly, the opposite side of the source of electrical energy is connected through a conductor 68, including in circuit therewith the measuring instrument 63, to certain sections of the commutating unit 66, and alternately through a conductor 69 including in circuit therewith the measuring instrument 64 to other sections of the commutating unit 66. The commutating unit 66 of the switching mechanism 67 is driven in synchronism by a suitable electrical motor 70 with commutating units 71, 72 and 73, which serve to selectively connect the inputs of the respective conventional filter means 74, 75 and 76 to respective measuring instruments 77, 78, and 79 to various potential measuring electrodes situated at the remote location in the bore hole, but with respective electrical resistance elements 80, 81 and 82 connected across the inputs to corresponding filter means during idle periods in the time cycle of operation of the different commutating units of the switching mechanism 67.

In this embodiment, in contrast to that of Fig. 1 wherein a logging current of substantially constant magnitude but of alternating polarity was fed to the current electrodes A and B, the battery 61 is alternately connected by the commutating unit 66 between a current electrode 83 and a remote current return point 85, which may be either an electrical ground or may be a connection to the sheath of the cable (not shown) supporting the logging arrays suspended in the bore hole 86 and current electrodes 83 and 84. Because of the different current paths alternately provided by the commutating unit 66, logging current of one substantially constant magnitude represented by pulses 87 and 88 of the logging current curve in Fig. 4A is emitted between the electrode 83 and the current return point 85, and logging current of a different substantially constant magnitude with alternating polarity, as represented by pulses 89 and 90 of the curve of Fig. 4A, is emitted between the electrodes 83 and 84, the current intensity for the last current emitting combination being far higher than that for the first.

This is accomplished by the commutating unit 66 by means of commutating sections 91 and 92 having brushes connected respectively to a conductor 93 leading to the current electrode 83 and a conductor 94 leading to the ground 85, and brushes connected to conductor 65 and 68 leading from the source of electrical energy to provide the current pulse 87 for a period of time somewhat less than the full first quarter cycle, as shown in Fig. 4A.

Commutators sections 95 and 96 include brushes repectively connected to conductors 94 and 93, and brushes connected respectively to conductors 65 and 68 to provide the current pulse 88 during at least a portion of the third quarter cycle, which is of the same magnitude as current pulse 87, but of opposite polarity because of the reversal of the conductors 93 and 94, as shown in Fig. 4A.

Commutator sections 97 and 98 include brushes connected respectively to the conductor 93 leading to the electrode 83 and a conductor 99 leading to the current electrode 84, and brushes connected to conductors 65 and 69 leading from the source of electrical energy, to provide the current pulse 89 during at least a portion of the second quarter cycle. Commutator sections 101 and 102 include brushes respectively connected to conductors 99 and 93, and brushes connected to conductors 68 and 69 to provide the current pulse 90 during at least a portion of the fourth quarter cycle equal in magnitude to pulse 89 but of opposite polarity because of the reversed connections to conductors 99 and 93, as shown in Fig. 4A.

Commutating unit 71 selectively connects potential measuring electrodes 103 and 104, which are in spaced-apart relation, the electrode 103 being interposed between the current electrodes 83 and 84 and the electrode 104 being positioned at a predetermined point above the current electrode 103, in alternately reversed fashion to the input of the filter means 74 and the measuring instrument 77 by means of conductors 105 and 106 to provide rectified measured potential pulses 107 and 108 (Fig. 4B) during portions of the first and third quarter cycles when the logging current from the logging current pulses 87 and 88 have been established. At other times 109 (Fig. 4B), the commutating unit 71 connects the resistance element 80 across the input to the filter means 74, in accordance with the manner described in more detail with reference to the commutating unit 50 of Fig. 1.

Commutating unit 72 acts in the same manner to alternately and reversibly connect the potential measuring electrodes 110 and 104, the electrode 110 being positioned at a predetermined point relatively near to but above the current electrode 84 through respective conductors 111 and 106 to the input of the filter means 75 and the measuring instrument 78 to provide measured potential pulses 112 and 113 (Fig. 4C) in portions of the first and third quarter cycles after the logging current pulses 87 and 88 have been established, with the resistance means 81 being connected across the input to the filter means 75 during at least some of the intermediate periods 114.

Commutating unit 73 is substantially the same as commutating units 71 and 72, except that its sections are shifted by approximately one quarter cycle to provide measured potential pulses 115 and 116 during at least a portion of the second and fourth quarter cycles after the logging current pulses 89 and 90 have been established by connecting the potential measuring electrodes 116 and 104, respectively, through conductors 117 and 106 to the input of the filter means 76, with the resistance means 82 being connected across the input to the filter means 76 during at least some of the intermediate idle time periods 118 (Fig. 4D). The measuring electrode 116 is spaced apart from but positioned intermediate the electrodes 104 and 110.

Since it is intended that the measuring instruments 77, 78 and 79 shall be responsive only to the measured potentials induced by the alternating current artificially created in the bore hole by the source of electrical energy including the battery 61, capacitance means 119, 120 and 121 are inserted in the conductors 105, 111, and 117, respectively, to block the flow of steady-state currents resulting from spontaneous potentials in the bore hole 86, for example.

In order to measure spontaneous potentials, in a manner well known in the art of electrical well logging, the potential measuring electrode 103 is connected through the conductor 105, a conductor 122 and a spontaneous potential measuring instrument 123 to ground or other suitable potential reference point.

Thus apparatus is provided for passing currents of different magnitudes through portions of a bore hole and adjacent earth formation during successive intervals of time, as indicated in Fig. 4A, and measuring potential differences resulting from said currents at different spaced apart points in the bore hole at different portions of the time cycle, as indicated in Figs. 4B, 4C and 4D, as well as simultaneously measuring spontaneous potentials occurring in the bore hole at at least one point thereof, in which simple conventional filter means may be used to block unwanted alternating current components resulting from the process of rectification without need to resort to the use of complicated and bulky filtering means having a constant input resistance.

The value of the various electrical resistance elements 80, 81 and 82 are respectively determined in the same manner as that of the aforementioned resistance element 40 in the embodiment of Fig. 1 to be the equivalent of the conductors and other down hole equipment leading from the switching mechanism 67 into the bore hole.

It will be understood by those skilled in the art that the above-described embodiments are meant to be merely exemplary and that they are susceptible of modification and variation without departing from the spirit and scope of the invention. For example, while the configuration of the various commutating sections of the switching mechanisms of the embodiments provide current flow and potential measurements during specific portions of the time cycle, with intermediate idle or inoperative time periods during which it is necessary to insert the equivalent resistances across the inputs to the filtering and measuring units, the duration and time location of these periods are susceptible of wide variation. Further, the insertion and removal of the resistance elements in the circuit may be done either exactly at each end of the corresponding idle period or immediately thereafter. Therefore, it is deemed that the invention is not limited except as defined in the appended claims.

I claim:

1. In telemetering apparatus having a measuring instrument responsive to electrical signals transmitted at least in part over electrical conductors from signal producing means at a remote location, in which the input to said measuring instrument is connected through an electrical filter means having input leads connected thereto and said electrical conductors are periodically disconnected from said input leads for predetermined intervals of time, the improvement comprising electrical resistance means having a value substantially equal to the value of the resistance of said electrical conductors and cooperating signal producing means, and periodically operated means introducing said electrical resistance means across said input leads during at least a portion of said predetermined intervals of time when said input leads are disconnected from said electrical conductors.

2. Electrical logging apparatus having a measuring instrument responsive to periodic electrical signals transmitted at least in part over electrical conductors from signal producing means at a remote location in a bore hole or the like, in which the input to said measuring instrument is connected through an electrical filter means having input leads connected thereto from a periodically operated switching mechanism adapted to connect and disconnect said input leads and said electrical conductors, said input leads being disconnected from said electrical conductors for predetermined intervals of time, the improvement comprising electrical resistance means having a value substantially equal to the value of the resistance of said electrical conductors and cooperating signal producing means, and periodically operated switching mechanism for introducing said electrical resistance means across said input leads during at least a portion of said predetermined intervals of time when said input leads are disconnected from said electrical conductors.

3. In electrical well logging apparatus having current emitting and potential measuring electrode means adapted to be passed through a bore hole and connected by means of electrical conductors to the surface of the earth, a source of electrical energy, first periodically operated switching mechanism for connecting said source of electrical energy to the electrical conductors leading to the current emitting electrode means during predetermined intervals of time, measuring means at the surface having electrical filter means in the input circuit thereof, second periodically operated switching mechanism operated in synchronism with said first switching mechanism for connecting the electrical conductors leading from said potential measuring electrodes to said filter means during at least a portion of the predetermined intervals of time when said source of electrical energy is connected to said conductors leading to said current emitting electrode means, and for disconnecting said electrical conductors from said filter means during predetermined intervals of time, the improvement comprising electrical resistance means having a value substantially equal to the value of the resistance of said electrical conductors and cooperating potential measuring electrode means, and periodically operated switching means operating in synchronism with said first and second switching mechanisms for introducing said electrical resistance means across the input to said electrical filter means during at least a portion of said predetermined intervals of time when said electrical conductors are disconnecting from said filter means.

4. In electrical well logging apparatus as claimed in claim 3, said first periodically operated switching mechanism alternately reversing the connections between said source of electrical energy and said electrical conductors leading to the current emitting electrode means, and said second periodically operated switching mechanism alternately reversing the connections between said filter means and said electrical conductors leading from said potential measuring electrodes in synchronism with the reversal of connections effected by said first periodically operated switching mechanism.

5. Electrical well logging apparatus, comprising current emitting electrode means adapted to be passed through a bore hole and connected by electrical conductor means to the surface of the earth, a source of electrical energy, first periodically operated switching mechanism for connecting said source of electrical energy to said electrical conductor means leading to said current emitting electrode means during predetermined intervals of time and for alternately reversing the connections of said source of electrical energy to said electrical conductor means to establish an electrical current distribution in said bore hole of alternating polarity, potential measuring electrode means adapted to be passed through said bore hole and to be influenced by said current distribution, measuring means including filter means having input leads connected thereto, electrical conductor means leading from said potential electrode measuring means to the surface of the earth, second periodically operated switching mechanism operated in synchronism with said first switching mechanism for connecting the input leads of said measuring means to a reference point and to said conductor means leading from said potential measuring electrode means during at least a portion of the interval of time when said current distribution of one polarity is established in the bore hole, for reversing the connections of said reference point and said conductor leading from said potential measuring electrode means to said input leads of said measuring means during at least a portion of the time when said current distribution of the opposite polarity is established in the bore hole, and for disconnecting said input leads of said measuring means from said reference point and said conductor leading from said potential measuring electrode means during intermediate intervals of time, electrical resistance means having a value substantially equal to the value of resistance of said electrical conductor means and cooperating potential measuring electrode means, and periodically operated switching means operating in synchronism with said first and second switching mechanisms for connecting said electrical resistance means to said input leads of said measuring means during at least a portion of said intermediate intervals of time when said electrical conductor means and said reference point are disconnected from said input leads.

6. In electrical well logging apparatus as claimed in claim 5, wherein said source of electrical energy, cooperating current emitting electrode means, and first periodically operated switching mechanism include means to establish current distributions in said bore hole of different magnitudes but of the same polarity during successive intervals of time; and said measuring means includes individual measuring apparatus and respective filter means having input leads connected thereto selectively enabled by said second periodically operated switching means to be responsive to respective current distributions of different magnitudes during at least portions of said successive intervals of time when said current distributions are established and to have the respective input leads connected to respective electrical resistance means during at least a portion of said intermediate intervals of time when said individual measuring apparatus is not responsive to said respective current distributions of different magnitudes.

References Cited in the file of this patent

UNITED STATES PATENTS

| | | |
|---|---|---|
| Re. 21,914 | Muzzey | Sept. 30, 1941 |
| 2,343,140 | Evjen | Feb. 29, 1944 |
| 2,375,777 | Evjen | May 15, 1945 |